United States Patent Office.

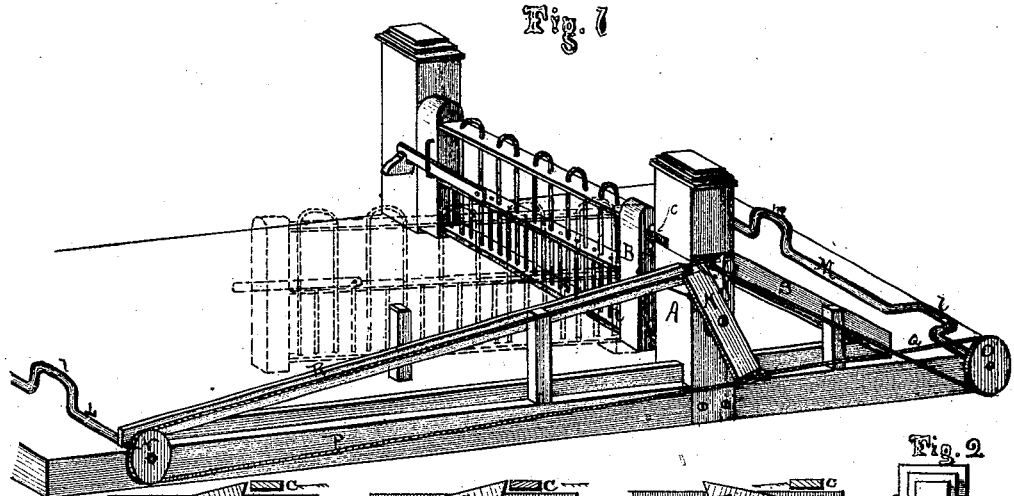
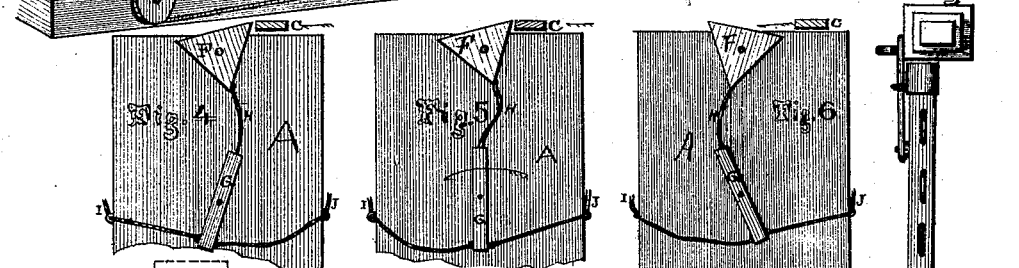
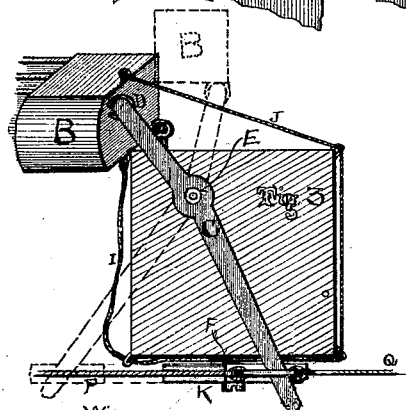
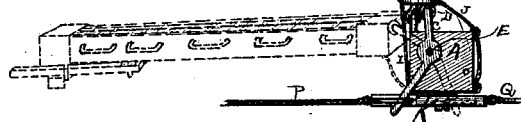

ROBERT T. BOWNE, OF FALLSTON, MARYLAND.

Letters Patent No. 109,713, dated November 29, 1870.

IMPROVEMENT IN GATES.

The Schedule referred to in these Letters Patent and making part of the same.

*To all whom it may concern:*

Be it known that I, ROBERT T. BOWNE, of Fallston, in the county of Harford and State of Maryland, have invented a new and useful Improvement in Automatic Gates; and I do hereby declare the following to be a full, clear, and exact description of the same, reference being had to the accompanying drawing, in which—

Figure 1 is a perspective view of my gate.
Figure 2 is a plan view of the same.
Figure 3 is an enlarged plan of a part of the same.
Figures 4, 5, 6, elevations of the stop-latch, showing its mode of action.

My invention relates to that class of automatic gates which is operated by means of cranks to be pushed down by the wheel of the vehicle which is about to pass through the gate.

Gates of this class, so far as I am informed, have all been liable to some of the following objections: First, complicated mechanism, easily deranged, and with difficulty repaired; second, liability to obstruction by the presence of foreign matters; third, liability to derangement by ice and snow in winter; fourth, necessity of keeping the crank depressed for a considerable time until the gate has swung nearly half-way open, &c. Some of these objections are consequent upon the arrangement of the mechanism below ground, but the fourth-named is perhaps as important as any, because it is very difficult to stop a carriage so that the wheel shall rest upon the crank and keep it pressed down while the gate is swinging, especially when the gate swings toward the horse. When the crank is pressed down and immediately released, as will be the case when the wheel passes over it, the gate will generally remain latched, because appreciable time is required in overcoming its inertia and establishing its movement.

My invention obviates the above objections, first, by simplicity of mechanism, which, if deranged, may be repaired by an unskilled person, and which may be applied to any gate already in use; second, the impossibility of obstruction by foreign matters, unless by design; third, by placing all of the parts above ground, where ice or snow cannot obstruct their action; fourth, by a latch which will hold the parts in position when once moved by the crank; and My invention, therefore, consists—

First, in arranging the devices to operate in either direction by a positive pull, so that motion may be communicated by wires or equivalent means.

Second, in the arrangement of levers to raise the latch-end of the gate and throw it outside of the center or gravity so that it will swing open.

Third, in a supplemental latch to hold the lever which controls the motion of the gate when it has once been moved.

That others may fully understand my invention I will particularly describe it.

The gate-post A, to which the gate B is hung, is cut off at about the height of the upper hinge, and the lever C is pivoted at E upon the top of said post, as shown in figs. 1, 2, and 3.

At one end of the lever C a pintle is formed, and said pintle is inserted in an eye, D, attached to the inner upright bar of the gate B, and forms the upper hinge of said gate. The lower hinge is formed by a corresponding eye, and a pintle set rigidly in the post in the usual manner.

It will be observed that the upper hinge-eye D is near one edge of the upright bar, and the lower hinge-eye is set near the opposite edge, so that the axial line is not vertical, but is oblique to the plane of the gate, so that the weight of the gate will always tend to close it when opened. While the hinges of the gate are in the relative positions described, the gate itself is arranged to stand upright and level when closed, the lever C being then in the position shown in fig. 2.

The opposite end of the lever C projects beyond the rear side of the post A, and, by the application of force to said projected end, may be carried around in the arc of a circle about the pivot E, as shown in figs. 2 and 3, and this movement produces two effects: first, the upper hinge passes over the lower one so as to incline the axial line from the opposite direction, and the gravity of the gate will then cause it to swing open; second, the upper hinge and top of the gate are drawn backward so as to raise the front end and free the latch. The gate then swings open, as shown in dotted lines in figs. 1 and 2. A counter-movement of the lever C brings the gate again upright and causes it close.

If the lever C should be suddenly moved, as above stated, and instantly released, the inertia and weight of the gate would cause a reaction before it commenced to swing, and the gate would remain closed. When the gate is to be opened, it is therefore necessary to depress and hold the lever C for a certain length of time until the gate has swung about half-way open, when its momentum will insure its further and proper movement in the same direction. I accomplish the required holding of the lever by a peculiar latch, which is double acting, and will hold in either direction.

The block F, figs. 1, 2, 5, 6, is pivoted to the rear side of the post A in such a position that, when canted in one direction, one of its corners will project above the post and form a stop from one direction, and, when canted in the opposite way, another corner will form a stop from the opposite direction, as shown in figs. 5 and 6.

The lower part of the block F is attached to a short lever, G, by a straight flat spring, H, of low power.

The lever G is pivoted to the post A, so that, as it moves one way or the other, it affects the spring H, as shown in fig. 5, and causes the latch F to be released.

The lever G is attached to the gate by cords I J running around opposite sides of the post A, and said cords are allowed some slack, so that they do not become taut and act upon the lever G until the swing of the gate is nearly completed. Said lever is then suddenly moved, and the latch reversed, as in fig. 6, so as to be in position to catch and hold the lever C when it is moved again.

Now the lever C, whenever it is moved far enough to cause the gate to open, is stopped and held by the latch F, and no matter how suddenly the moving-power may be applied and released, said latch will catch and hold it until the gate has swung nearly open, when said latch will be automatically reversed, as above described.

I will now describe the means by which the motions of the lever C and gate B are produced.

A lever, K, is pivoted at its center to the rear side of the post A, and the upper end of said lever is provided with a slot or metal loop, through which the end of the lever C projects.

At a proper distance from the gate the crank-rods L M are laid across the road, and are protected in any convenient way. Their ends rest in suitable bearings. The cranks *l m* are arranged on opposite sides of the roadway, so that the driver may always have the elevated crank, against which he is to drive, at his right hand.

At one end of each crank-rod there is a pulley, N O, and a wire or wire-cord, P Q, extends from the two ends of the lever K around each of these pulleys, the cord or wire being crossed at one side, Q, so as to give the same motion to the lever from a corresponding motion of the crank-rod. In practice, I find that telegraph-wire will operate satisfactorily for this purpose.

If it is desired to employ a double gate, the crank-rods are supplied with pulleys N O at each end, and the devices are duplicated.

The wires or cords may be protected from cattle, &c., by boards R S extending from post A to the pulleys, and hiding the wires P Q behind them.

When the gate is to be opened the elevated crank is depressed and the pulley thereby rotated. This causes the lever K to swing upon its pivot and operate the lever C with effect above described. The depression of the crank, which is elevated when the gate is open, has the effect to close it in a similar way.

It will be perceived that the lever K is moved in either direction by a positive pull upon the wire or cord instead of being moved in one direction by a push motion, requiring a very stiff rod. It will also be perceived that, if the crank is once fully depressed, no matter how quickly, the gate will open or close, as the case may be.

The lever G may be dispensed with, the end of the spring H being rigidly attached to the post A, and the pull of the cords I J being communicated directly to the latch F above its pivot; but I do not think that arrangement preferable to the one above described.

This gate may be opened by hand like any ordinary gate, and without moving any of its mechanism except the latch F if the gate be fully opened.

Having described my invention,

What I claim as new is—

1. The lever K, pivoted at its center, in combination with the cords P Q and pulleys N O at the ends of the crank-rods L M, so that said lever may always be moved by a positive pull to operate the gate, as set forth.

2. In combination with the lever C or its equivalent, arranged to operate the gate B, as described, the latch F, constructed to operate substantially as set forth.

ROBT. T. BOWNE.

Witnesses:
CALEB J. MOORE,
WILLIAM SHROFF.